(12) United States Patent
Kondo (10) Patent No.: US 8,783,951 B2
(45) Date of Patent: Jul. 22, 2014

(54) MINIATURE LINEAR MOTION GUIDE UNIT

(75) Inventor: Masatoshi Kondo, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/568,840

(22) Filed: Aug. 7, 2012

(65) Prior Publication Data

US 2013/0044968 A1  Feb. 21, 2013

(30) Foreign Application Priority Data

Aug. 19, 2011  (JP) ................. 2011-179616

(51) Int. Cl.
 *F16C 29/06*  (2006.01)
(52) U.S. Cl.
 USPC ............................................. 384/45
(58) Field of Classification Search
 USPC .......................... 384/43–45, 49, 50
 See application file for complete search history.

(56) References Cited

U.S. PATENT DOCUMENTS

| 5,102,235 A | * | 4/1992 | Mugglestone | ................. 384/45 |
| 6,520,681 B2 | * | 2/2003 | Ishihara | ....................... 384/45 |
| 6,729,761 B2 | * | 5/2004 | Matsui et al. | .................. 384/45 |
| 8,465,206 B2 | | 6/2013 | Kondo | |

FOREIGN PATENT DOCUMENTS

| JP | 6185716 U | 6/1986 |
| JP | 2003090338 A | 3/2003 |
| JP | 2012047288 | 3/2012 |
| JP | 2013015189 | 1/2013 |

* cited by examiner

*Primary Examiner* — James Pilkington
(74) *Attorney, Agent, or Firm* — Browdy and Neimark, PPLC (57) ABSTRACT

A miniature linear motion guide unit is described in which a tubular member for a return passage is installed in an outward open recess cut in the carriage and a covering to bear the tubular member is integral with an end cap major part. This construction helps make the slider compact with cost saving in production. The slider is composed of a carriage made up of an upper portion and side bulges extending downward and having the outward open recesses, end caps having turn-around passages, the tubular members lying on outsides of the side bulges of the carriage, and coverings connected integrally with the end cap major parts to embrace the tubular members in combination with the outsides of the carriage.

6 Claims, 10 Drawing Sheets

MINIATURE LINEAR MOTION GUIDE UNIT

FIELD OF THE INVENTION

The present invention relates to a miniature linear motion guide unit comprised of an elongated guide rail and a slider that is allowed to move on the elongated guide rail relatively to the guide rail through rolling elements.

BACKGROUND OF THE INVENTION

Linear motion guide units have been extensively applied in recent years between two parts which slide relative to each other for linear reciprocating mechanism used in increased industrial fields including semiconductor fabricating equipment, machine tools, industrial robots, and so on. Recently advanced machines and instruments are increasingly required energy saving, simple construction and less production cost, and further in need of keeping running cost and maintenance cost of equipment reasonably less than ever. Correspondingly, the linear motion guide units incorporated in the advanced machinery are also challenged to make their construction compact and simplified, keeping down the production cost while ensuring the current performances, along with realizing virtual maintenance-free operating condition for lubrication.

In the commonly assigned Japanese Laid-Open Patent Application No. 2003-90 338 referred later as patent literature 1, there is disclosed a linear motion guide unit in which tubular connectors are installed to communicate turnaround passages with their associated return passage. The prior linear motion guide unit constructed as recited earlier is envisaged making sure of smooth recirculation of the ball rolling elements as well as long-lasting continuous application of lubricant around the rolling elements so as to realize the virtual maintenance-free operating condition for lubrication. With the prior linear motion guide unit, the maintenance-free operation for lubrication has been made possible by the tubular connectors which join the turnaround passages to the return passages of sintered resinous material of cellular texture to complete the smooth circulating circuit. Moreover, the slider is composed of a carriage having a through-bore, a tubular member inserted into the through-bore to define the return passage, the tubular member in lengthwise dimension being short of the carriage to lay the through-bore bare at lengthwise opposite ends after the tubular member has been inserted inside the through-bore, a spacer having a spacer part to provide an inside circular half of the turnaround passage and an inside circular half of the tubular connector, which comes into mating with the inside circular half of the turnaround passage to form the end of the return passage, and an end cap to provide an outside circular half of the turnaround passage and an outside circular half of the tubular connector, which comes into mating with the outside circular half of the turnaround passage to form the end of the return passage.

Another linear guide device is disclosed in Japanese Laid-Open Utility Model Application No. S61-85 716, in which a carriage of a slider has lengthwise grooves on widthwise opposite sides thereof, the grooves being closed with closure plates to provide passage to allow balls returning through there. With the prior linear guide device, the closure plates to provide the return passages have widthwise dimensions enough to close the grooves cut on the sides of the carriage across the overall length of the carriage and lengthwise dimensions more than the overall length of the carriage. The closure plates are held at their ends with end caps.

With the linear motion guide unit disclosed in the patent literature 1, as shown in FIGS. 1 to 5 in the patent gazette of Japanese Laid-Open Patent Application No. 2003-90 338, the through-bore is formed in the carriage of the slider and then the tubular member is inserted in the through-bore to provide the return passage. This drilling or boring operation to make the through-hole is difficult to make with high precision and has a high working cost. Thus, this prior art poses a serious challenge in compact, simple construction and reduced production cost.

The linear guide device disclosed in Japanese Laid-Open Utility Model Application No. S61-85 716 has no concept or motivation of developing a maintenance-free operation in which the lubricant is applied around the rolling elements at the return passages. In the prior guide device, moreover, a further challenge still remains about how many components or parts are mutually arranged with accuracy to make certain of smooth circulation of the rolling elements.

The miniature linear motion guide unit of the present invention, while being a derivation from the commonly-assigned Japanese Laid-Open Patent Application No. 2012-47 288, is a further development of the same technical concept in the linear motion guide unit disclosed in the commonly-assigned senior Japanese patent application No. 2013-15189. The miniature linear motion guide unit of the present invention is focused on the subject matter about what construction makes cost reductions possible in compliance with recent need for cost savings in production. With the miniature linear motion guide unit of the present invention, especially, a tubular member to form a return passage or a covering to embrace the tubular member is made integrally with an end cap or, as an alternative, separately from the end cap so as to facilitate and simplify assembly of the components for the sake of cost savings while carrying out maintenance-free for lubrication to get the ball rolling elements smoothly circulating.

SUMMARY OF THE INVENTION

The present invention has as its principal object to overcome the major challenges as stated earlier, and to provide a linear motion guide unit in which a carriage in sidewise opposed bulges thereof is not drilled for return passages to allow ball rolling elements to roll through there as in the conventional art, but rather made concave inwardly of the side surfaces of the bulges to form sideward grooves in which tubular members fit snugly to provide the return passages, and end caps have coverings to close the sideward grooves with embracing the tubular members. The linear motion guide unit constructed as stated earlier according to the present invention is designed to facilitate and simplify the machining process on the carriage, doing more to downsize the guide unit as a whole, helping dispose various components with accuracy to make assembly of the components into the slider easier, and making it possible to manufacture the overall slider at low cost in which the balls are allowed to smoothly roll through the circulating circuits.

The present invention is concerned with a linear motion guide unit comprising a guide rail having first lengthwise raceway grooves on both longitudinal sides thereof, a slider that fits over or conforms to the guide rail and has second raceway grooves extending lengthwise in opposition to the first raceway grooves, and a plurality of ball rolling elements rolling through circulating circuits made up of races defined between the first raceway grooves and the second raceway grooves, return passages extending in the slider in parallel with the races, and turnaround passages connecting the races with the return passages in the slider.

The slider is composed of a carriage which is made up of a flat upper portion spreading above and in opposition to a top surface of the guide rail and side bulges lying on widthwise opposite sides of the upper portion to extend downward alongside of the longitudinal sides of the guide rail and further having the second raceway grooves on inside surfaces thereof, a pair of the end caps secured on lengthwise opposite ends of the carriage, one to each end, and provided therein with the turnaround passages, a pair of the cylindrical tubular members lying on outsides of the side bulges of the carriage to extend in a longitudinal direction, the tubular members having circular through-holes serving as the return passages, and a pair of coverings connected with the end caps to embrace the tubular members in combination with the outsides of the side bulges of the carriage.

According to the present invention, there is provided a linear motion guide unit in which the outsides of the side bulges of the carriage have lengthwise outward open recesses which are open outward to fit over or conform to outer cylindrical surfaces of the tubular members to keep the tubular members in parallel lengthwise with respect to the second raceway grooves, the outward open recesses being each constituted with a circular concave portion of arc in a cross section extending lengthwise of the carriage while conforming to the outer cylindrical surface of the tubular member, an upper relief side or relief portion extending lengthwise of an upper edge of the circular concave portion, and a lower relief side or portion extending lengthwise of a lower edge of the circular concave portion, and further wherein the circular concave portion of arc closely fits over the outer cylindrical surface of the tubular member, the upper relief side being formed to separate by a difference above spaced from a horizontal level of the upper edge of the circular concave portion to provide a clearance apart away from the outer cylindrical surface of the tubular member, and the lower relief side being formed to provide a clearance spaced away from the outer cylindrical surface of the tubular member, the lower relief side being defined by a tangential line or surface extending downwards from the circular concave portion at a preselected angle with respect to the horizontal level.

According to the present invention, the covering has an inner circular surface extended lengthwise and concaved in an arc in a cross section so as to make abutment against the outer cylindrical surface of the tubular member to embrace or cover over substantially half of the outer cylindrical surface of the tubular member. The covering has a contour constituted with a side wall and a bottom wall extending together lengthwise to form a L-shape in a cross section, the bottom wall having a lengthwise edge formed into a lengthwise tongue of wedged shape in a transverse section, and the lengthwise edge extending in the clearance defined between the tubular member and the lower relief side of the carriage to wedge or retain in place the tubular member.

According to the present invention, the end caps are each composed of a spacer part and an end cap major part which are assembled with each other into the end cap. The spacer part at a rear surface thereof comes into engagement or abutment against any one of the lengthwise opposite ends of the carriage and at a front surface opposite to the rear surface thereof has inside curved grooves of a pair of the turnaround passages. The end cap major part at a rear surface thereof makes engagement or abutment against the front surface of the spacer part and has outside curved grooves of a pair of the turnaround passages lying in opposition to the inside curved grooves of the turnaround passages. The end cap in which the end cap major part is combined with the spacer part has a pair of circular or annular portions raised above the rear surface of the end cap to form in part ends of the return passages which are in alignment with the return passages defined inside the tubular member. The paired circular or annular portions of the end cap are composed of a pair of semicircular halves raised above the rear surface of the spacer part to communicate with the inside curved grooves of the turnaround passages and a pair of other semicircular halves raised above the rear surface of the end cap major part to communicate with the outside curved grooves of the turnaround passages.

Moreover, the covering has an overall length equivalent to a total length of the tubular member and twice a length of the annular portion so that the overall length of the covering is selected dependent on a length of the carriage. Moreover, the lengthwise side wall of the covering has a lengthwise side surface set back inward with respect to a lengthwise outside of the carriage, and the lengthwise bottom wall of the covering has a bottom surface set back inward with respect a lower surface of the carriage.

The covering is joined at one lengthwise end thereof with one of the semicircular portions on one of the end cap major parts, while another end of the covering has a tenon or protrusion which fits into a mortise or recess cut deep along an outer circular surface of the semicircular portion on another end cap major part whereby the covering is secured between the end caps opposite to each other across the carriage. As an alternative, the covering at each of the lengthwise opposite ends thereof has the tenons or projections which fit into the mortises or recesses cut deep along the outer circular surfaces of the semicircular portions on the end cap major parts whereby the covering is secured between the end caps opposite to each other across the carriage.

The tubular member has a porous or cellular structure and lubricant retained in the tubular member gets oozed out of pores or cells of the porous structure and is applied around the balls by a stress or impact of the balls rolling through the return passages. The outward open recess and the second raceway groove on the carriage are machined simultaneously at one chucking, so that the outward open recess is set at accurate location relative to the second raceway groove. Moreover, the outward open recess on the carriage comes into engagement with the tubular member across an embracing amount (h) of 25% or more of a diameter of the tubular member.

The linear motion guide unit constructed as stated earlier is suited for miniaturization of the linear motion guide units because of no need to drill through-holes in the side bulges of the carriage to fit over the sleeve for the return passage as opposed to the prior art. Only machining lengthwise the outward open recesses on the outsides of the side bulges of the carriage is sufficient to install the return passages in the carriage. This means easy machining with cost saving. With the linear motion guide unit befitted for miniaturization of the present invention, especially, the outward open recess on the carriage can be easily machined at the same time with the second raceway groove at one chucking, so that the outward open recess is set at accurate location relative to the second raceway groove. The tubular member can be snugly installed in the outward open recess and securely embraced from outside by the covering connected with the end caps. The tubular member incorporated in the slider as stated earlier helps provide easily and accurately the return passage without accompanying variations in the location of the return passage from one to another, which might otherwise cause any assembly errors, thereby making the circulating circuit through which the ball rolling elements are allowed to smoothly move. Moreover, the relief sides along the upper lengthwise edge and lower lengthwise edge of the outward open recess make it easier to machine the concave portion of arc in a cross section. Moreover, the lengthwise edge of the bottom wall is formed into the lengthwise tongue of wedged shape in a transverse section. The tongue extends along the lower relief side in the clearance defined between the tubular member and the lower relief side of the carriage to tightly wedge or retain the tubular member in place.

The covering made integral or detachable from the end caps has an L-shape in a transverse section to make it possible to embrace about a half the periphery of the tubular member to support tightly the tubular member. With the linear motion guide unit in which the coverings are each jointed integrally with the semicircular portion on one of the end cap major parts, the attachment of the end caps in which the end cap major part and the spacer part have been assembled with each other onto the ends of the carriage in turn results in installation of the coverings to embrace the tubular members lying inside the outward open recesses in the carriage, so that the slider can be easily finished. The covering constructed as stated earlier helps reduce the number of parts and needs only preparation of a pair of the end cap major parts identical in construction. As for the end caps installed in pairs across the carriage, they are lighter to handle because just one type of end cap is sufficient. With the linear motion guide unit of the present invention, moreover, substantial maintenance-free operation for lubrication is performed by only installation of the tubular members of lubricant-impregnated porous material between the outward open recesses and the coverings.

DETAILED DESCRIPTION OF THE PREFERRED EMBODIMENTS

The linear motion guide unit according to the present invention is well adapted for use in any relatively sliding components to make certain of smooth relative movement between parts or equipment in machinery as diverse as semiconductor manufacturing equipment, machine tools, various assembling machines, conveyers, various robots, precision machinery, measurement/inspection instruments, medical instruments, micromachines, and so on. Especially, the present invention is motivated to develop a downsized linear motion guide unit referred hereinafter to as a miniature linear motion guide unit. The miniature linear motion guide unit of the present invention will be explained with reference to the accompanying drawings.

Figure 1:
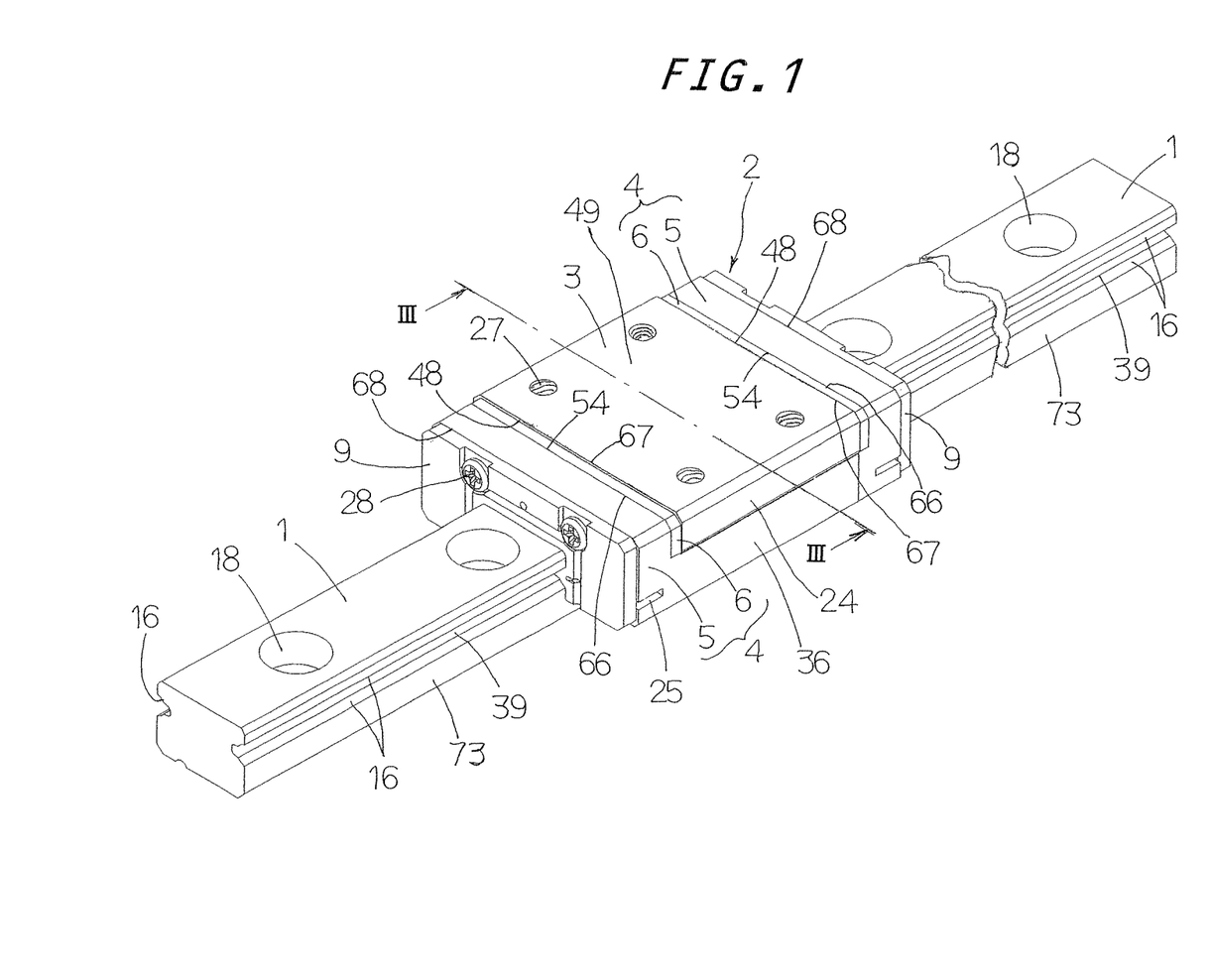
FIG. 1 is a partially cutaway view in perspective illustrating a preferred embodiment of a miniature linear motion guide unit according to the present invention.

The miniature linear motion guide unit of the present invention as shown in FIG. 1 is composed of an elongated guide rail 1 of rectangular shape in a transverse section having raceway grooves 16 or first raceway grooves on longitudinal sides 73 thereof, and a slider 2 that fits over or conform to the guide rail 1 for linear movement relatively to the guide rail 1. The linear motion guide unit is befitted for downsized guide unit in which the guide rail 1 has for example a width of 7 mm and a height of 5 mm, the slider 2 has for example a width of 17 mm and a height of 23.5 mm and an overall height from a bottom level of the guide rail up to the top 49 of the slider 2 measures 8 mm. The miniature linear motion guide unit of the present invention, as shown in FIG. 2 to 5 or 18, features that tubular members 7 are laid further out of side bulges 22 of a carriage 3 of the slider 2 and coverings 8 is placed to shield the tubular members 7 in a fashion embracing the tubular members 7. Moreover, the version illustrated here features that the coverings 8 are made integral with end cap major parts 5 of end caps 4 of the slider 2.

Referring to FIGS. 1 to 5, the miniature linear motion guide unit is shown as being generally composed the elongated guide rail 1, the slider 2 that fits over the guide rail 1 in a way to move relatively to the guide rail 1, the slider 2 having raceway grooves 17 or second raceway grooves extending in opposition to the raceway grooves 16 on the guide rail 1 to define load-carrying races 40 between them and further having return passage 20 extending in parallel with the load-carrying races 40, and a plurality of the ball rolling elements 29 rolling through circulating circuits 50 made up of the load-carrying races 40, the return passage 20 and turnaround passages 15 made in the slider 2 to connect the load-carrying races 40 with the return passage 20. The guide rail 1 is made on a top surface thereof with some holes 18 that are used to fasten the guide rail 1 to any stationary bed including a machine bed, mounting base, workbench, and so on. On the carriage 3 of the slider 2, there are made some threaded holes 27 that are used to fasten any instruments to a reference surface on the top 49 of the carriage 3. Moreover, the slider 2 has retainer bands 26 to keep the rolling elements 29 against falling out or apart from the load-carrying races 40 in the slider 2 even after the slider 2 has been demounted from the guide rail 1, and end seals 9 attached to outward front surfaces 68 of the end caps 4, one to each end cap 4, the end seals 9 having lips to exclude dust and dirt from the circulating circuits 50. The retainer bands 26 recedes into relief grooves 39 to move lengthwise with respect to the guide rail 1 as the slider 2 moves relatively to the guide rail 1. The retainer bands 26 fit into grooves 25 which are cut on an end cap major parts 5 of the end caps 4 to extend from the outward front surfaces 68 to side surfaces of the end cap major parts 5 of the end caps 4. Locating pins 59 are raised above the outward front surfaces 68 of the end cap major part 5 and, correspondingly, the end seals 9 have locating recesses 78 which are designed to fit over the locating pins 59 to keep the end seals 9 in place with respect to the end caps 4.

With the miniature linear motion guide unit of the present invention, the slider 2 is especially composed of the carriage 3 which is made up of a flat upper portion 21 spreading above and in opposition to the top surface of the guide rail 1 and side bulges 22 lying on widthwise opposite sides of the upper portion 21 to extend downward alongside of the longitudinal sides 73 of the guide rail 1, the side bulges having the second raceway grooves 17 on inside surfaces thereof confronting the longitudinal sides 73 of the guide rail 1, a pair of the end caps 4 secured on lengthwise opposite ends 48 or forward and aft ends of the carriage 3, one to each end, and made therein with the turnaround passages 15, a pair of the tubular members 7 lying on outsides 24 of the side bulges 22 of the carriage 3 to extend in a longitudinal direction or a sliding direction, the tubular members 7 having circular through-holes serving as the return passages 20, and a pair of the coverings 8 connected with the end caps 4 to embrace the tubular members 7 in combination with the outsides 24 of the side bulges 22 of the carriage 3. On the widthwise opposite outsides 24 on the side bulges 22 of the carriage 3, as seen in FIGS. 2 to 4 and 6, there are provided lengthwise outward open recesses 19 which open outward to fit over or conform to outer cylindrical surfaces of the tubular members 7 to keep lengthwise the tubular members 7 in parallel with the second raceway grooves 17. The outward open recesses 19 are each constituted with a circular concave portion 45 of arc in a cross section extending lengthwise of the carriage 3 while conforming to the outer cylindrical surface of the tubular member 7, an upper relief side or relief portion 33 extending lengthwise from an upper edge of the circular concave portion 45, and a lower relief side or portion 32 extending lengthwise from a lower edge of the circular concave portion 45. The upper relief side 33 is formed to separate above spaced apart from the horizontal level of the upper edge of the circular concave portion 45 by a clearance 74 of a difference δ in level. The lower relief side 32 is formed to provide a clearance 75 which is defined by a tangential line or surface extending downwards from the circular concave portion 45 at a preselected angle of θ with respect to the horizontal level. Here are δ=0.05 mm and θ=50 degrees. Moreover, the outward open recesses 19 are each designed to come into engagement with the tubular member 7 across an embracing depth h>0.25 D, where D is the diameter of the tubular member 7.

With the outward open recess 19 having the relief sides at the upper and lower edges thereof in the carriage 3, the circular concave portion 45 may be easily cut at the same time with the second raceway groove 17. Namely, the circular concave portion 45 and the second raceway groove 17 are machined simultaneously at one chucking, so that the circular concave portion 45 can be set at an accurate location relative to the raceway groove 17 and cut to fit snugly over the outside circular surface of the tubular member 7 to bear securely the tubular member 7 therein. The tubular member 7 fits closely into the circular concave portion 45 and helps provide easily and accurately the return passage 20 without accompanying variations from one to another case, which might otherwise cause any assembly errors. Thus, the tubular member 7 fits closely into the circular concave portion 45 as stated earlier makes it possible to provide the circulating circuit 50 through which the ball rolling elements 29 are allowed to smoothly roll. It is to be understood that the earlier description "the circular concave portion 45 fits snugly over the outside circular surface of the tubular member 7 to bear securely the tubular member 7" is envisaged that the tubular member 7 not only keeps a perfect circle thereof without collapsed, but bears any impact or stress caused by the ball rolling elements 29 rolling through the return passage 20, and as a result, the tubular member 7 is held to have no impact on the circulation of the ball rolling elements 29.

The covering 8, as shown in FIGS. 2 to 5, 8, 9, and 18, has a lengthwise major body 60 extending to make abutment against the outer cylindrical surface of the tubular member 7 to embrace or cover from side and below over the substantially half of the outer cylindrical surface of the tubular member 7. The lengthwise major body 60 has an inner circular surface 62 extended lengthwise and concaved in the arc in a cross section so as to conform to an outside circular surface 70 of the tubular member 7, and a side wall 34 and a bottom wall 35 extending together lengthwise to form a L-shape in a cross section, the side wall 34 having a side surface 36 set back slightly inward than a lengthwise outside 24 of the carriage 3, and the bottom wall 35 having a bottom surface 37 set back slightly inward with respect to a lower surface 61 of the carriage 3. Moreover, a lengthwise edge of the bottom wall 35 is formed into a tongue 23 having a wedged shape in a transverse section, which extends in the clearance 75 defined between the tubular member 7 and the lower relief side 32 of the carriage 3 to wedge or retain in place the tubular member 7. The tubular member 7 is enclosed or covered substantially all around with the inner circular surface 62 of the covering 8 and the outward open recess 19 of the carriage 3. More especially, the tongue 23 extended out of the bottom wall 35 to fit into the clearance 75 between the tubular member 7 and the carriage 3, having the wedged shape in a transverse section, wedges itself into the clearance 75 and bites the relief side 32 of the carriage 3, whereby the covering 8 retains securely the tubular member 7 over the overall length thereof to embrace firmly the tubular member 7 in association with the outward open recesses 19 of the carriage 3. With the lengthwise covering 8 of L-shape in a cross section, moreover, the side wall 34 is made to have a relatively larger thickness at an upper portion 38 of which a top surface 47 slants so as to lengthwise come into close engagement or conform from below to a slope 46 (an inclination of θ1), which is formed on the underneath of the side bulge 22 of the carriage 3. The upper thicker portion 38 of the side wall 34 serves to give the side wall 34 a stiffness or rigidity enough to protect the side wall 34 against any deformation or warp thereby ensuring the secure retention of the tubular member 7.

Figure 2:
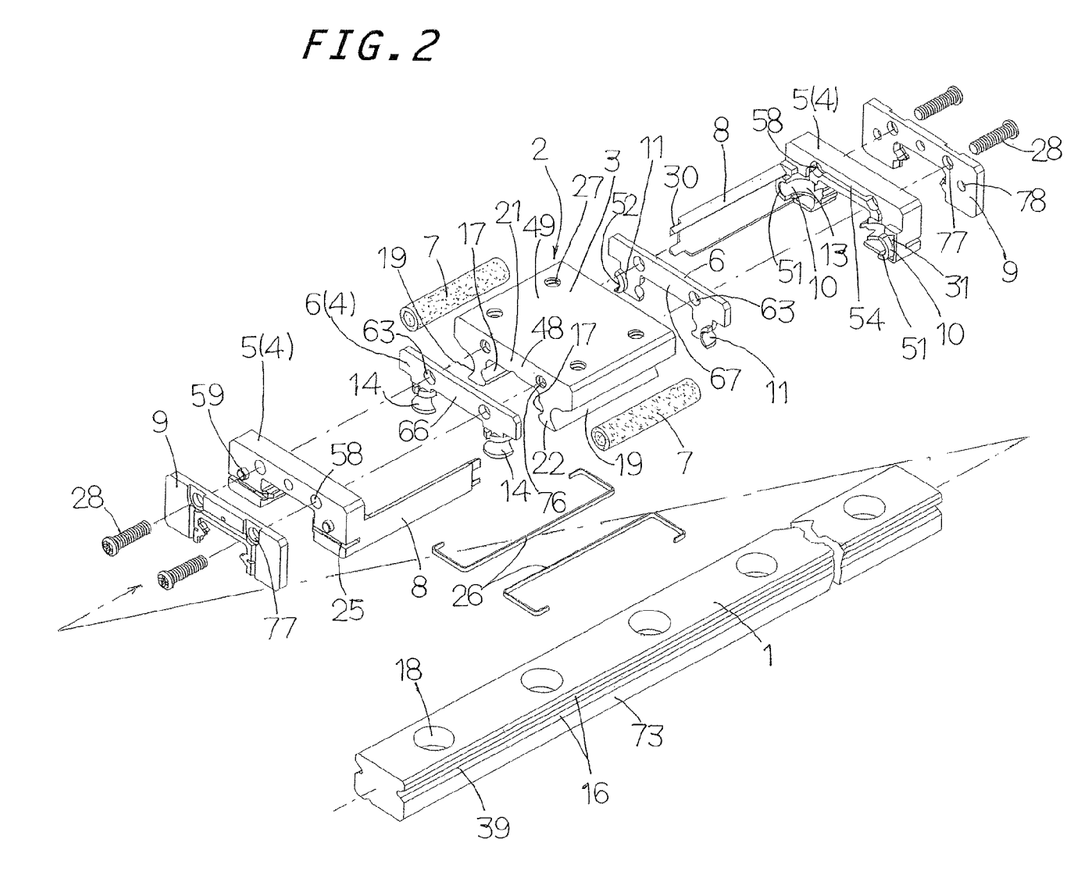
FIG. 2 is an exploded view in perspective of the miniature linear motion guide unit of FIG. 1.
Figure 3:
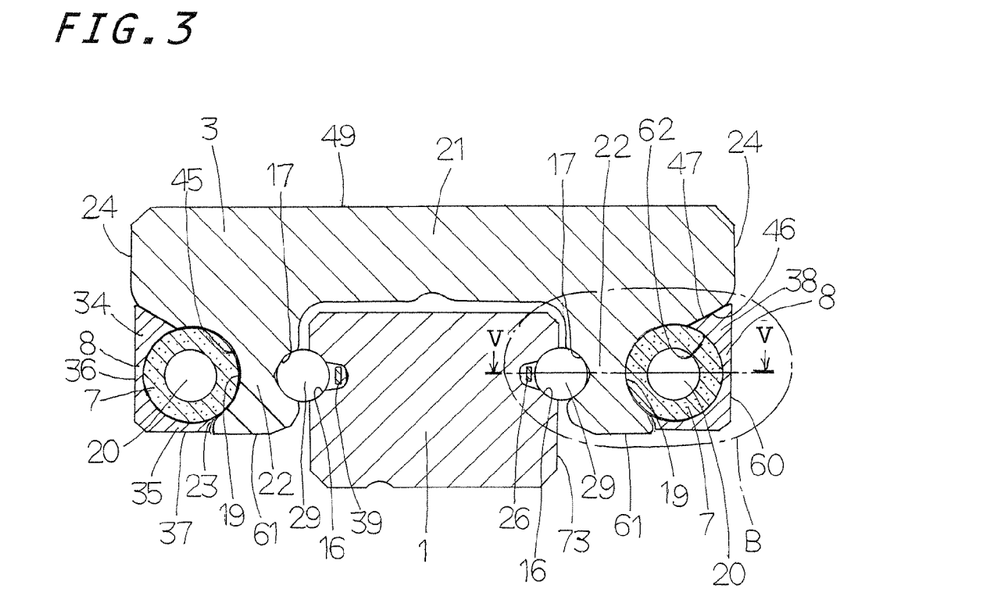
FIG. 3 is a view in transverse section of the miniature linear motion guide unit of FIG. 1, the view being taken on the vertical plane of the line III-III of FIG. 1.
Figure 4:
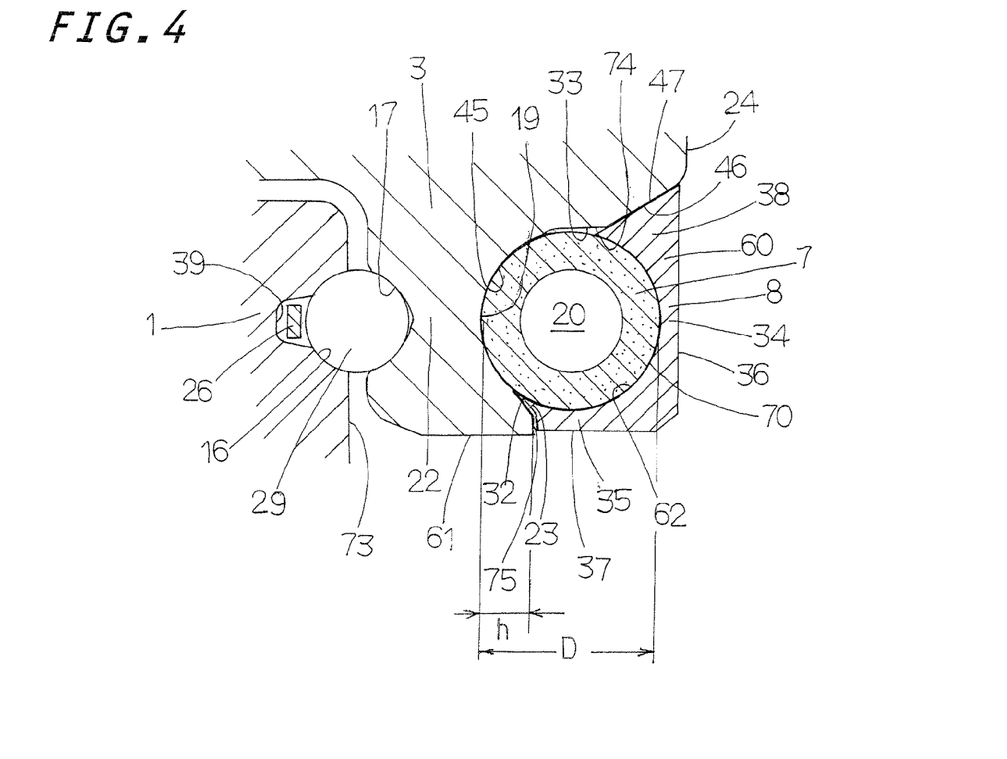
FIG. 4 is an enlarged fragmentary detail showing an area encircled at B of the miniature linear motion guide unit of FIG. 3.
Figure 5:
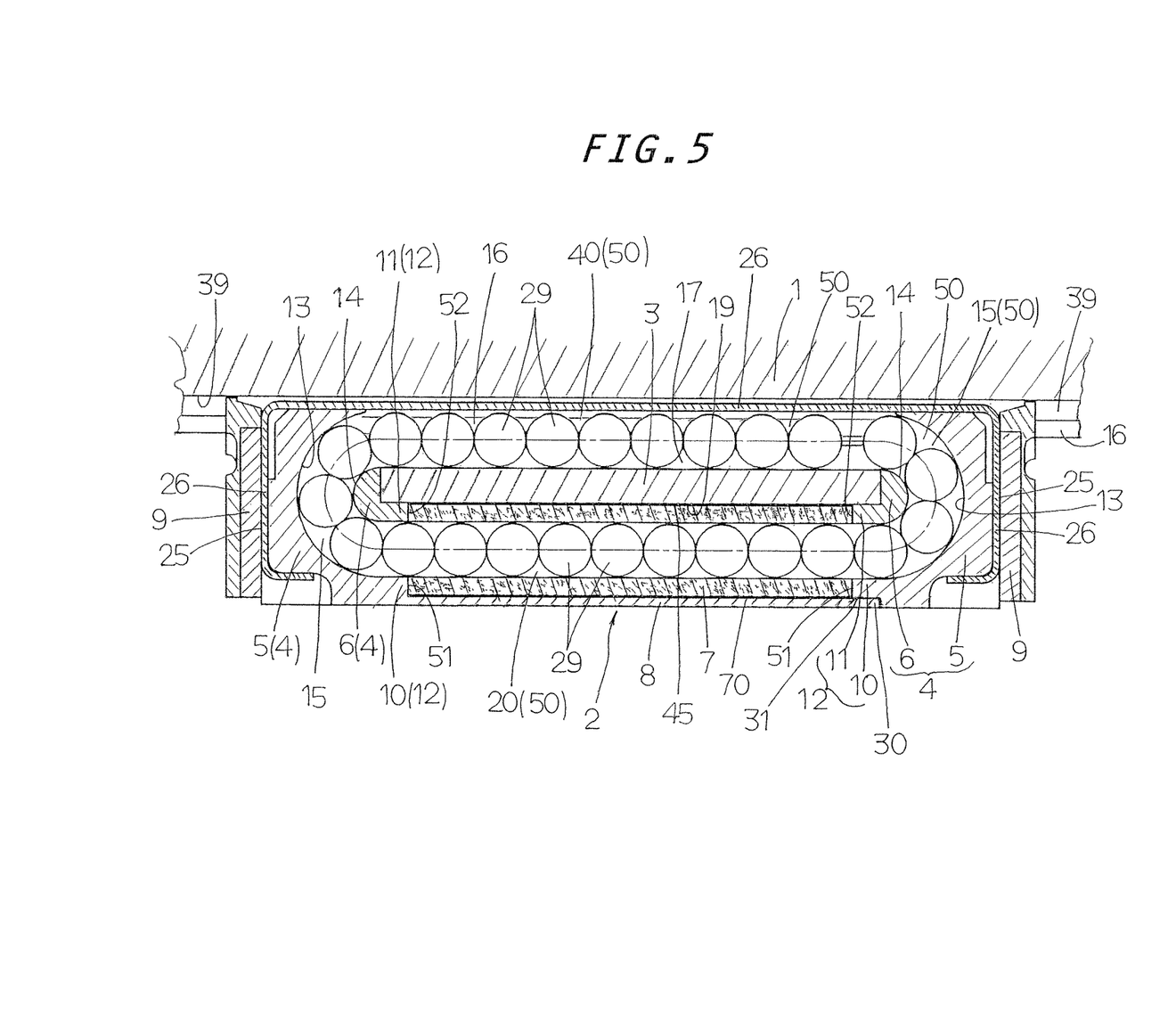
FIG. 5 is a view in section to illustrate a version of a circulating circuit to allow rolling elements to roll through there, the view being taken on the horizontal plane of the line V-V in the miniature linear motion guide unit of FIG. 3.
Figure 6:
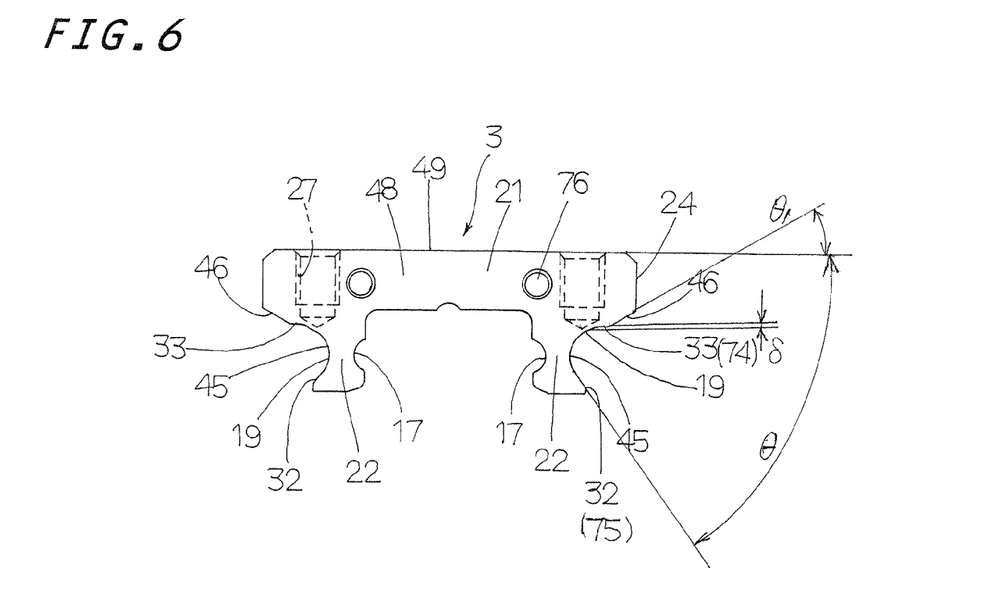
FIG. 6 is a view in front elevation of a carriage in the miniature linear motion guide unit of FIG. 1.
Figure 7:
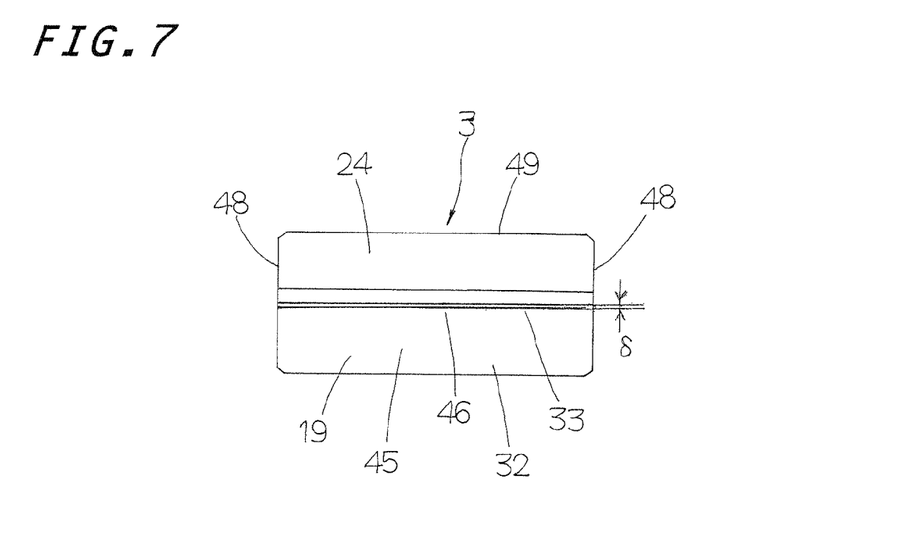
FIG. 7 is a view in side elevation of the carriage of FIG. 6.
Figure 8:
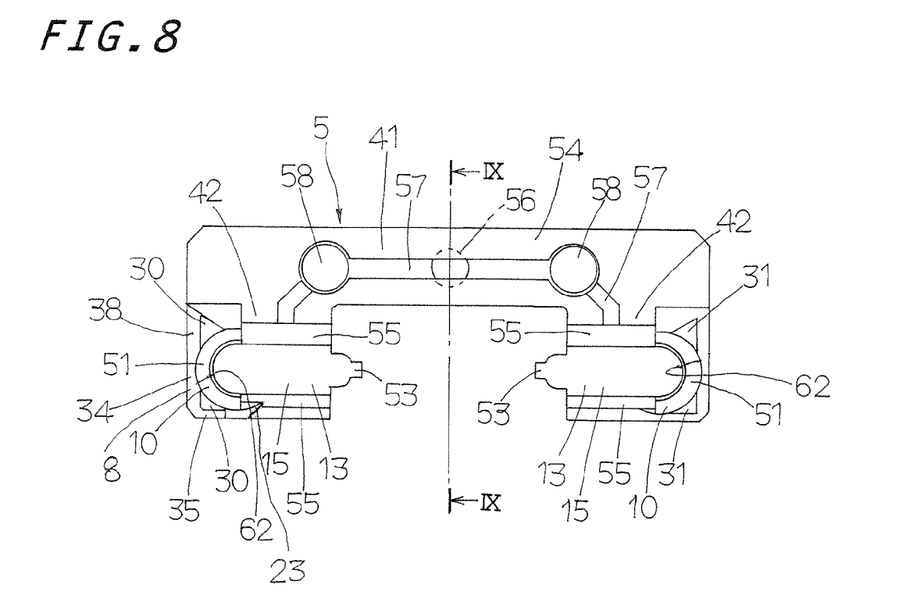
FIG. 8 is a view in rear elevation of an end cap major part to be assembled in an end cap of the miniature linear motion guide unit of FIG. 1.
Figure 9:
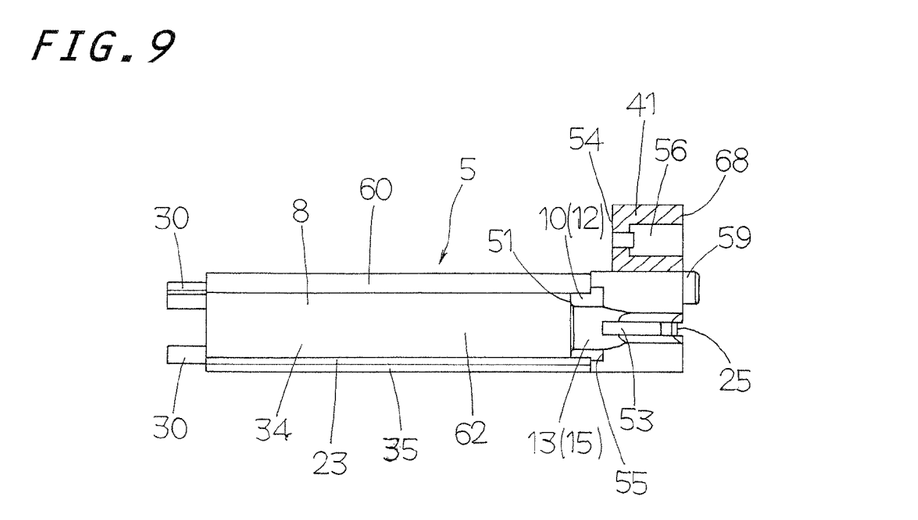
FIG. 9 is a view in section of the end cap major part, the view being taken on the plane of the line IX-IX in the end cap major part of FIG. 8.
Figure 10:
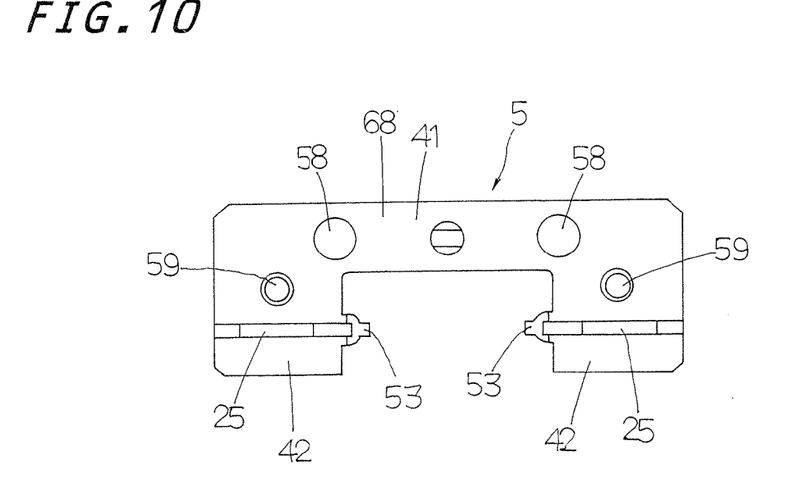
FIG. 10 is a view in front elevation of the end cap major part in the miniature linear motion guide unit of FIG. 1.
Figure 11:
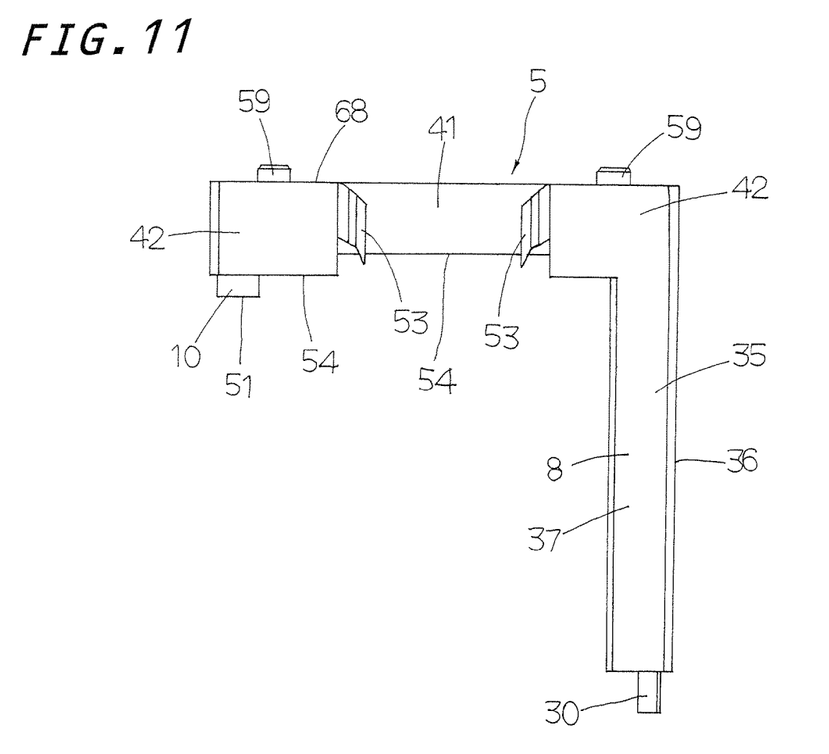
FIG. 11 is a view in bottom plan of the end cap major part of FIG. 10.
Figure 12:
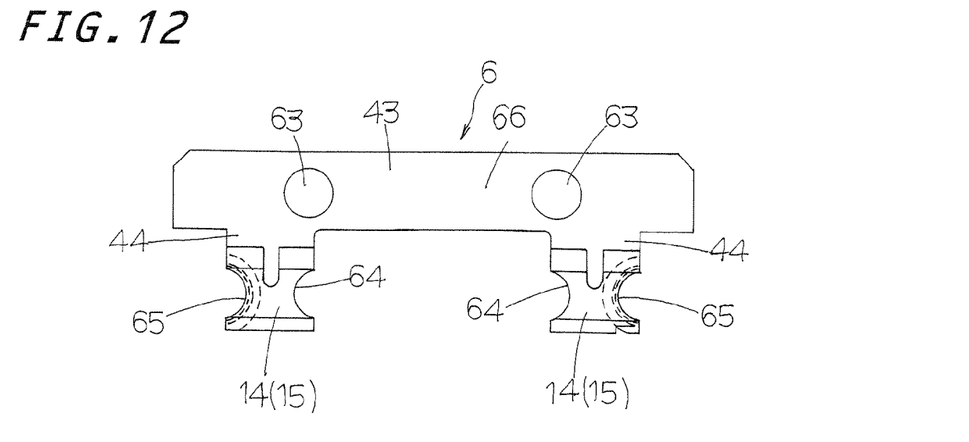
FIG. 12 is a view in front elevation of a spacer part in the miniature linear motion guide unit of FIG. 1.
Figure 13:
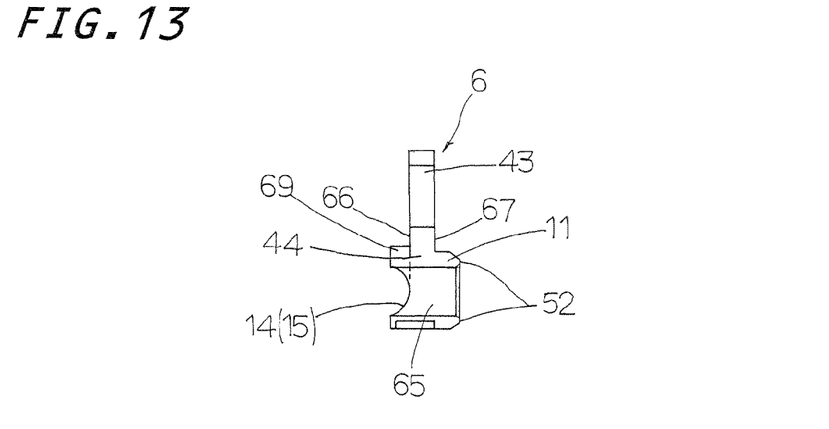
FIG. 13 is a view in side elevation of the spacer part of FIG. 12.
Figure 14:
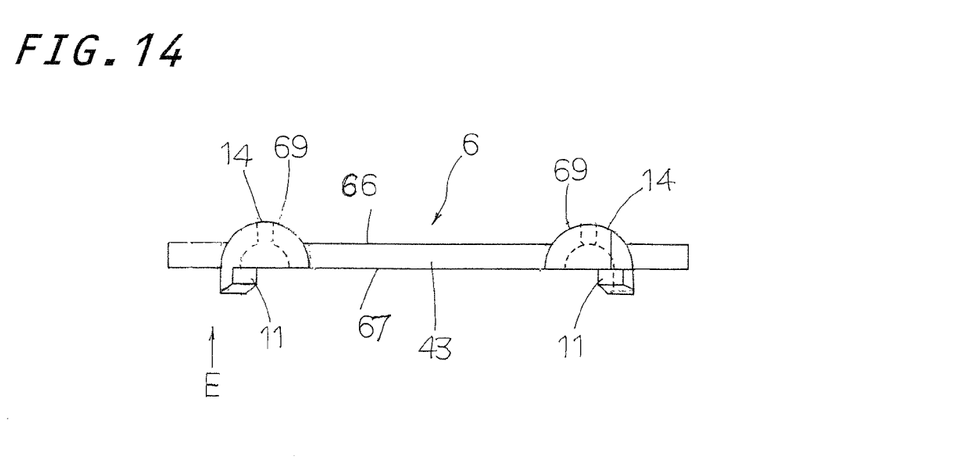
FIG. 14 is a view in bottom plan of the spacer part of FIG. 12.
Figure 15:
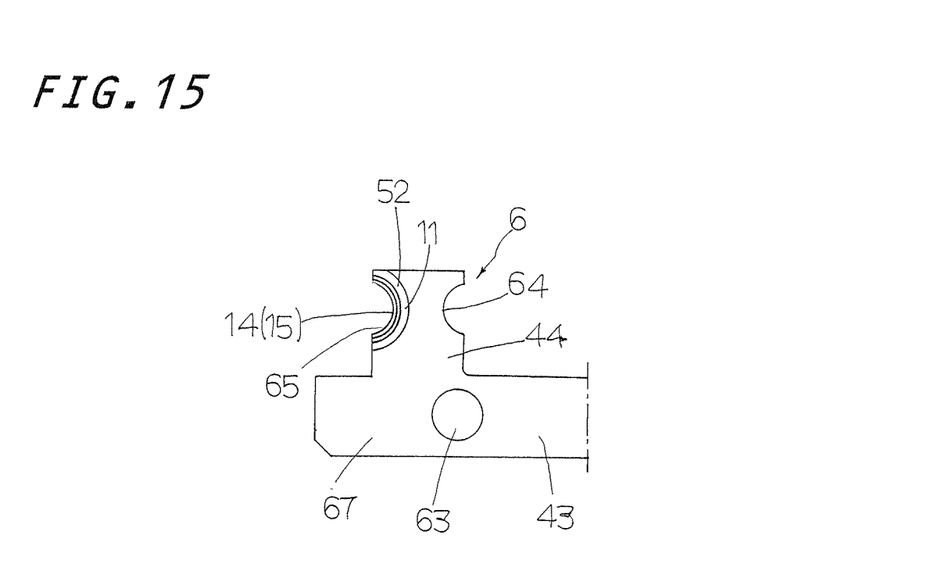
FIG. 15 is an enlarged fragmentary detail in rear elevation of the spacer part when viewed in the direction of an arrow E of FIG. 14.
Figure 16:
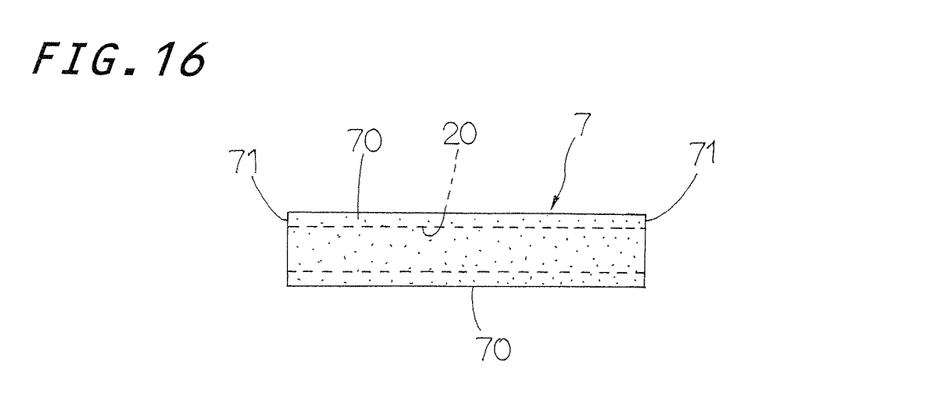
FIG. 16 is a view in front elevation of a tubular member to be installed in the miniature linear motion guide unit of FIG. 2.
Figure 17:
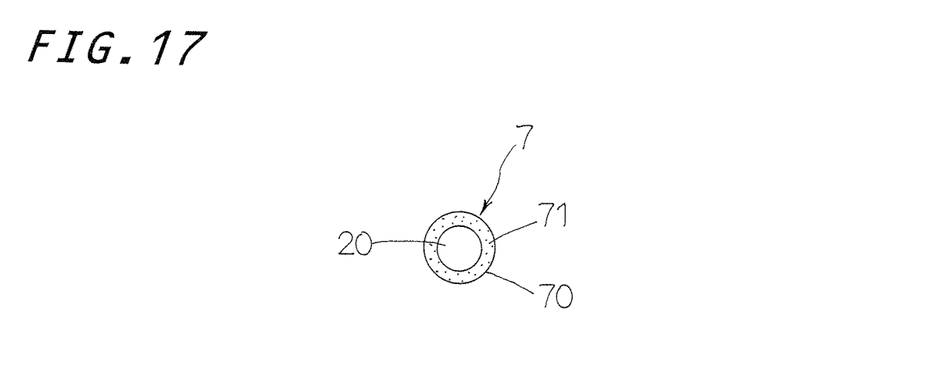
FIG. 17 is a view in side elevation of the tubular member of FIG. 16.
Figure 18:
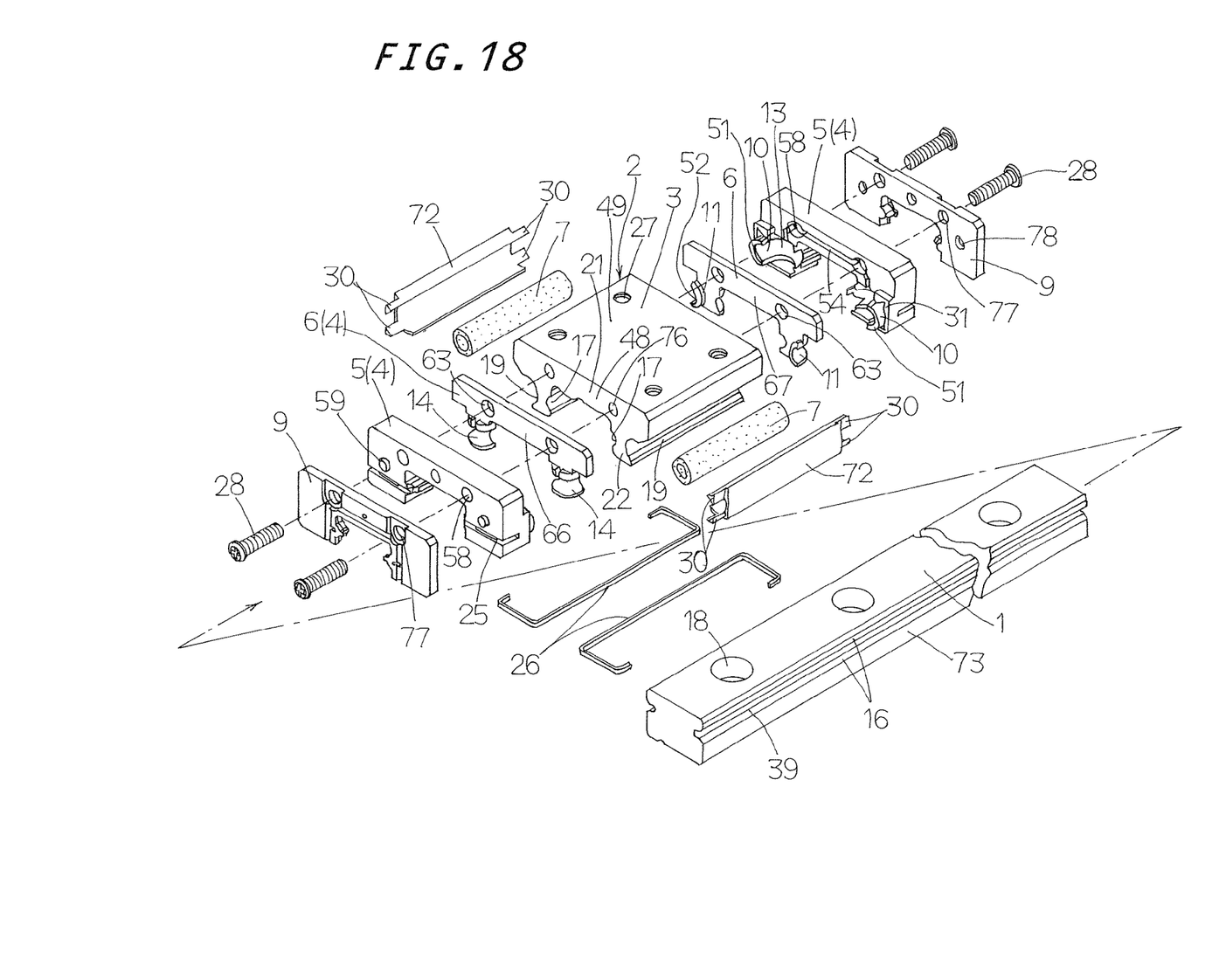
FIG. 18 is an exploited view showing another version of the miniature linear motion guide unit according to the present invention.

With the miniature linear motion guide unit of the present invention, the end caps 4 as shown in FIGS. 1, 2 and 18 arranged on the forward and aft ends 48 of the carriage 3 are each composed of a spacer part 6 and the end cap major part 5. The spacer part 6 at a rear surface 67 thereof comes into engagement or abutment against any one of the forward and aft ends 48 of the carriage 3 and at a front surface 66 opposite to the rear surface 67 thereof has inside curved grooves 14 of a pair of the turnaround passages 15. The end cap major part 5 at an end surface or rear surface 54 thereof comes into engagement or abutment against a front surface 66 of the spacer part 6 and has outside curved grooves 13 of a pair of the turnaround passages 15 lying in opposition to the inside curved grooves 14 of the turnaround passages 15. The end cap 4 is completed after the spacer part 6 was combined with the end cap major part 5 in such a relation that a bridge portion 43 of the space part 6 came into mating or engagement with the rear surface 54 of the end cap major part 5. Moreover, the end caps 4 tightened or fastened to the forward and aft ends of the carriage 3 each have a pair of circular or annular portions 12 each of which comes into abutment against any one of lengthwise opposite ends 71 of the tubular member 7 installed in the outward open recess 19 of the carriage 3. More especially, the paired circular or annular portions 12 on the end cap 4 are composed of a pair of outside semicircular portions 10 on the end cap major part 5 and a pair of inside semicircular portions 11 on the spacer part 6. After the spacer part 6 has been combined with the end cap major part 5, the outside semicircular portions 10 and the inside semicircular portions 11 are brought into mating or engagement relation with each other to complete the annular portions 12 on the end cap 4. Thus, the outside and inside semicircular portions 10 and 11 at their ends or edges 51 and 52 come into abutment against the lengthwise opposite ends 71 of the tubular member 7. That is, the end cap 4 has a pair of the circular or annular portions 12 raised above the rear surface 54 of the end cap 4 to form in part ends of the return passages 20 which is to be connected with the return passages 20 defined inside the tubular member 7. The annular portions 12 each are identical in a contour in a transverse section with the tubular member 7 and from 0.5 to 1 times as long as the diameter of the ball rolling elements 29. The outside semicircular portion 10 on the end cap major part 5, as shown in FIGS. 8, 9 and 11, is a semicircular half of the annular portion 12 raised above the rear surface 54 of the end cap major part 5 and connected with the outside curved groove 13 of the turnaround passage 15. The inside semicircular portion 11 on the spacer part 6, as shown in FIGS. 12 to 15, is a semicircular half of the annular portion 12 raised above a rear surface 67 of the spacer 6 and connected with the inside curved groove 15 of the turnaround passage 15. With the end cap 4 constructed as stated earlier, the outside curved grooves 13 of the turnaround passages 15 on the end cap major part 5 and the inside curved grooves 14 of the turnaround passages 15 on the spacer part 6 are combined with each other into the completed turnaround passages 15 and further there are provided the annular portions 12 which communicate with the turnaround passages 15 to ensure smooth transfer of the ball rolling elements 29 from cornering over the turnaround passages 15 to linear rolling through return passages 20, getting a smooth circulating motion of the rolling elements 29 throughout the circulating circuits 50.

With the miniature linear motion guide unit constructed as stated earlier, the covering 8 as shown in FIGS. 1, 2, 5, 8, 9, 11 and 18 has an overall length to shroud or envelop a total length of the tubular member 7 and the annular portions 12 of the lengthwise opposite end caps 4 which make abutment against forward and aft ends of the tubular member 7. Namely, the overall length of the covering 8 is equivalent to the total length of the tubular member 7 and twice the length of the annular portion 12 and therefore selected dependently to the length of the carriage 3. The covering 8 is molded integrally or joined at one of lengthwise ends thereof with one of the outside semicircular portions 10 on one of the end cap major parts 5 opposite each other across the carriage 3, while another end of the covering 8 has a tenon or protrusion 30 which is intended to fit into a mortise or recess 31 cut deep along an outer circular surface of another outside semicircular portions 10 on another end cap major part 5. In the embodiment described here, the covering 8 is very small in size and correspondingly, the protrusion 30 is 1 mm at the most. Integral molding or connection of the covering 8 at one end thereof with one of the outside semicircular portions 10 on the end cap major parts 5 helps secure the covering 8 to be self-supporting. With the construction in which the covering 8 is joined to one side of the end cap major part 5, the slider 4 can be finished by just installation of only a pair of the end cap major parts 5 each of which has the covering 8 on the ends of the carriage 3, one to each end. This permits universality of parts, fewer number of parts and easier assembly. Moreover, the tenons or protrusions 30 at the free end of the covering 8, as shown in FIGS. 2, 8 and 9, make a pair and each are made as massive as possible in a space permitted to fit securely into the opposite end cap 4.

The tubular member 7, as shown in FIGS. 2, 5, 16 and 17, is formed in a cylinder substantially straight from end to end having therein a through-hole to define the return passage 20. The tubular member 7 is entirely made of a sintered resinous material of porous or cellular structure which is able to be impregnated with lubricant. The tubular member 7 is kept in place with the lengthwise opposite ends 71 thereof coming into abutment against the ends 51, 52 of the circular or annular portions 12 of the end caps 4 to connect with return passage segments 65 of the circular portions 12 in the end caps 4 to complete the overall length of the return passage 20. More particular, the tubular member 7 is made of, for example, fine powdery ultrahigh molecular weight polyethylene which is molded at elevated temperature while compacted into a porous or cellular structure. The resulting compact in itself is sufficient in mechanical strength, workable with precise measurement and further superior in wear proof. The cellular structure in the sintered compact is very tough to cause any clogging while excellent in soaking up, retaining and getting oozing the lubricant. The tubular member 7 is born or stayed with the outward open recess 19 and the covering 8 against the stress of the balls 29 rolling through the return passage 20. Thus, the tubular member 7 is easily subjected to elastic deformation at locations heavily stressed or impacted by the balls 29, thereby getting the lubricant oozing out of cells or pores of the cellular structure to apply the lubricant around the balls 29. At the same time, upon the recovery from deformation into its original state, an excess of lubricant remaining in the return passage 20 is sucked back into the cells or pores in the inside wall the tubular member 7 to make sure of keeping the long-lasting application of adequate amount of lubricant around the balls 29.

The spacer part 6 assembled in the miniature linear motion guide unit constructed as stated earlier, as shown in FIGS. 12 to 15, is composed of the bridge portion 43 of flat surface spreading in conformity with the end 48 of the carriage 3 in opposition to end 48 of the flat upper portion 21 of the carriage 3, lugs 44 extending downwards from sidewise opposite ends of the bridge portion 43, and widthwise opposite turnaround passage portions 69 raised above front surfaces 66 of the lugs 44 and provided thereon with inside curved grooves 14 of the turnaround passages 15 which communicate with the raceway grooves 17 in the carriage 3. With the spacer part 6 constructed as stated earlier, moreover, there are provided the return passage segments 65 raised above the rear surface 67, the return passage segments 65 having thereon the inside semicircular portions 11 of the annular portions 12 to communicate the inside curved grooves 14 of the turnaround passages 15 with the return passages 20 across the spacer part 6. The spacer 6 on widthwise opposite insides of the lugs 44 thereof has raceway grooves 64 communicating with the raceway grooves 17 on the carriage 3.

The end cap major part 5 as shown in FIGS. 8 to 11 is composed of an upper bridge portion 41 of a configuration conformable to the end 48 of the carriage 3 to mate with the bridge portion 43 of the spacer part 6 in opposition to the flat upper portion 21 of the carriage 3, bulges 42 extending downwards from sidewise opposite ends of the upper bridge portion 41, widthwise opposite turnaround passage portions recessed below rear surfaces of the bulges 42 and provided therein with the outside curved grooves 13 of the turnaround passages 15, the outside curved grooves 13 being designed to connect at one side thereof with the raceway grooves 17 of the carriage 3 and mate at another end thereof with the inside turnaround passages 14 of the turnaround passages 15 on the spacer part 6, and the outside semicircular portions 10 raised above the rear surface 54 of the end cap major part 5 to connect with the outside curved grooves 13 of the turnaround passages 15. The upper bridge portion 41 of the end cap major part 5 has a pair of holes 58 which are used to complete the slider 2 with using fastener bolts 28. On the upper bridge portion 41 of the end cap major part 5, moreover, there is provided a lubricant port 56 lying in alignment with an oil supply opening in the end seal 9 and lubricating grooves 57 to communicate the lubricant port 56 to the turnaround passages 15. The upper bridge portion 41 of the end cap major part 5 is recessed at 55 below the rear surface 54 thereof to fit over the turnaround passage portions 69 of the spacer part 6 after the front surface 66 of the spacer part 6 has come into abutment against the rear surface 54 of the end cap major part 5. The end cap major part 5 at the bulges 42 thereof has scooping claws 53 that extend inside the load-carrying races 40 to make sure of smooth rolling of the balls 29 across the boundaries between the turnaround passages 15 and the load-carrying races 40. The upper bridge portion 43 of the spacer part 6 has a pair of holes 63 which are used to complete the slider 2 with using the fastener bolts 28. On the other hand, the carriage 3 on the forward and aft ends 48 thereof has a pair of threaded holes 76 into which the fastener bolts 28 driven to complete slider 2. The fastener bolts 28, after having extended through the holes 63 in the spacer part 6, holes 58 in the end cap major part 5 and holes 77 in the end seal 9, are driven into the treaded holes 76 in the carriage 3 to tighten the spacer part 6, end cap major part 5 and end seal 3 on the carriage 3.

Referring to FIG. 18, there is shown another version of the miniature linear motion guide unit of the present invention. This second version is the same in construction as the miniature linear motion guide unit stated earlier except for structure of the covering 8. In this second version, a covering 72 is prepared separately from other parts by itself, as opposed to the covering 8 integral with the end cap 4 as stated earlier. The covering 72 has a pair of tenons or projections 30 at each of the lengthwise opposite ends. Thus, the covering 72 can be held between the end caps 4 after the paired tenons 30 have fit into the mortises or recesses 31 in the end cap major parts 5 opposite to each other across the carriage 3. Thereafter, if the adhesive is applied to the mortise 31-and-tenon 30 joint between one of the end cap major parts 5 and the associated end of the covering 72 so as to make the permanent joint together with the semicircular portion 10 between them, this second version is modified to the same construction as the first version stated earlier. As a further alternative, when all of the mortise 31-and-tenon 30 joints between the forward and aft ends of the coverings 72 and their associated end cap major parts 5 are fixed with the adhesive to make the permanent joints together with the semicircular portions 10, the coverings 72 and the end caps 4 are assembled together in a rectangular frame of integral construction which can favor the strong support of the tubular members 7 by the coverings 72.

What is claimed is:

1. A linear motion guide unit comprising a guide rail having first lengthwise raceway grooves on both longitudinal sides thereof, a slider that fits over or conforms to the guide rail and has second raceway grooves extending lengthwise in opposition to the first raceway grooves, and a plurality of ball rolling elements rolling through circulating circuits made up of races defined between the first raceway grooves and the second raceway grooves, return passages extending in the slider in parallel with the races, and turnaround passages connecting the races with the return passages in the slider;

wherein the slider is composed of a carriage which is made up of a flat upper portion spreading above and in opposition to a top surface of the guide rail and side bulges lying on widthwise opposite sides of the upper portion to extend downward alongside of the longitudinal sides of the guide rail and further having the second raceway grooves on inside surfaces thereof, a pair of end caps secured on lengthwise opposite ends of the carriage, one to each end, and provided therein with the turnaround passages, a pair of cylindrical tubular members lying on outsides of the side bulges of the carriage to extend in a longitudinal direction, the tubular members having circular through-holes serving as the return passages, and a pair of coverings connected with the end caps to embrace the tubular members in combination with the outsides of the side bulges of the carriage, wherein the outsides of the side bulges of the carriage have lengthwise outward open recesses which are open outward to fit over or conform to outer cylindrical surfaces of the tubular members to keep the tubular members in parallel lengthwise with respect to the second raceway grooves, the outward open recesses being each constituted with a circular concave portion in a cross section extending lengthwise of the carriage while conforming to the outer cylindrical surface of the tubular member, an upper relief side or relief portion extending lengthwise of an upper edge of the circular concave portion, and a lower relief side or portion extending lengthwise of a lower edge of the circular concave portion, and further wherein the circular concave portion fits over the outer cylindrical surface of the tubular member, the upper relief side being formed to be separated by a difference above a horizontal level of the upper edge of the circular concave portion to provide a clearance spaced away from the outer cylindrical surface of the tubular member, and the lower relief side being formed to provide a clearance spaced away from the outer cylindrical surface of the tubular member, the clearance of the lower relief side being defined by a tangential line or surface extending downwards from the circular concave portion at a preselected angle with respect to the horizontal level, wherein the covering has an inner circular surface extended lengthwise and concaved in an arc in a cross section so as to make abutment against the outer cylindrical surface of the tubular member to embrace or cover over a substantial half of the outer cylindrical surface of the tubular member, the covering having a contour constituted with a side wall and a bottom wall extending together lengthwise to form a L-shape in a cross section, the bottom wall having a lengthwise edge formed into a lengthwise tongue having a wedged shape in a transverse section, and the lengthwise tongue extending in the clearance defined between the tubular member and the lower relief side of the carriage to wedge or retain in place the tubular member, wherein the lengthwise side wall of the covering has a lengthwise side surface set back with respect to a lengthwise outside of the carriage, and the lengthwise bottom wall of the covering has a bottom surface set back with respect to a lower surface of the carriage, and wherein the tubular member has a porous or cellular structure and lubricant retained in the tubular member gets oozed out of pores or cells of the porous structure to apply the lubricant around the ball rolling elements by a stress or impact of the ball rolling elements as the ball rolling elements roll through the return passages.

2. A linear motion guide unit constructed as defined in claim 1, wherein the end caps are each composed of a spacer part and an end cap major part which are assembled with each other into the end cap, the spacer part at a rear surface thereof making engagement or abutment against any one of the lengthwise opposite ends of the carriage and at a front surface opposite to the rear surface thereof having inside curved grooves of the turnaround passages, the end cap major part at a rear surface thereof making engagement or abutment against the front surface of the spacer part and having outside curved grooves of the pair of the turnaround passages lying in opposition to the inside curved grooves of the turnaround passages, the end cap of the end cap major part combined with the spacer part having a pair of circular or annular portions raised above the rear surface of the end cap to form in part ends of the return passages which are in alignment with the return passages defined inside the tubular member, and the paired circular or annular portions on the end cap being composed of a pair of semicircular halves raised above the rear surface of the spacer part to communicate with the inside curved grooves of the turnaround passages and a pair of other semicircular halves raised above the rear surface of the end cap major part to communicate with the outside curved grooves of the turnaround passages.

3. A linear motion guide unit constructed as defined in claim 2, wherein the covering has an overall length equivalent to a total length of the tubular member and twice a length of the annular portion, the overall length of the covering being selected dependently to a length of the carriage.

4. A linear motion guide unit constructed as defined in claim 2, wherein the covering is joined at one of lengthwise ends thereof with one of the semicircular portions on one of the end cap major parts, while another end of the covering has a tenon or protrusion which fits into a mortise or recess cut along an outer circular surface of the semicircular portion on another end cap major part whereby the covering is connected between the end caps opposite to each other across the carriage.

5. A linear motion guide unit constructed as defined in claim 2, wherein the covering at each of the lengthwise opposite ends thereof has the tenons or projections which fit into the mortises or recesses cut along the outer circular surfaces of the semicircular portions on the end cap major parts whereby the covering is connected between the end caps opposite to each other across the carriage.

6. A linear motion guide unit constructed as defined in claim 1, wherein the outward open recess on the carriage comes into engagement with the tubular member across a retaining amount of 25% or more of a diameter of the tubular member.

* * * * *